UNITED STATES PATENT OFFICE.

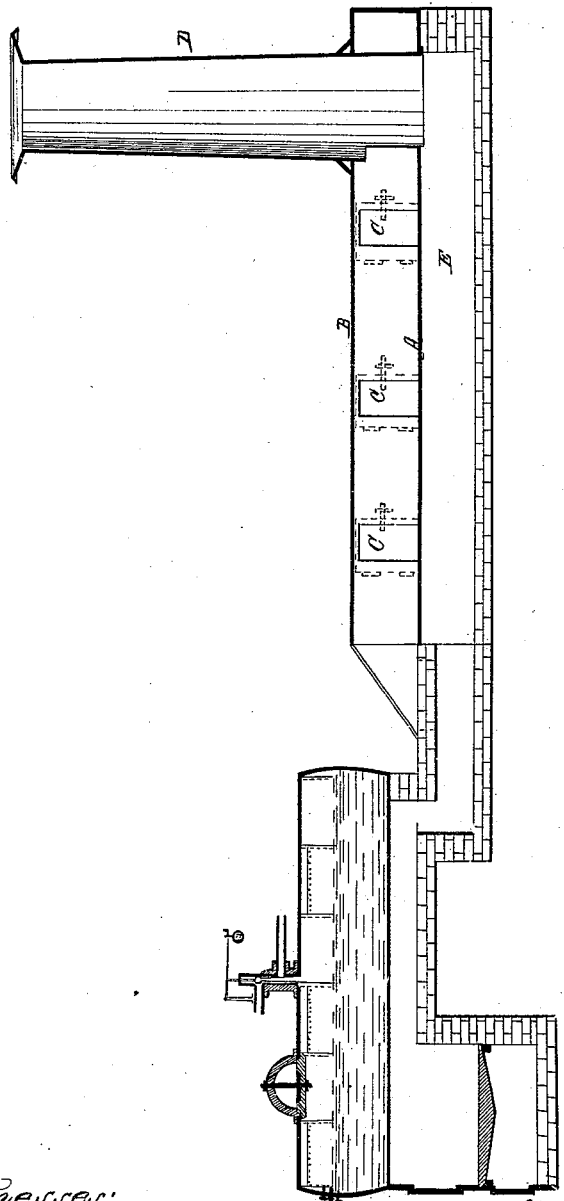

LORENZO SIBERT, OF STAUNTON, VIRGINIA.

IMPROVEMENT IN DESULPHURIZING AURO-PYRITES AND OTHER ORES.

Specification forming part of Letters Patent No. 107,553, dated September 20, 1870; antedated September 5, 1870.

*To all whom it may concern:*

Be it known that I, LORENZO SIBERT, of Siberton, near Staunton, in Augusta county and State of Virginia, have invented certain new and useful Improvements in Desulphurizing Auro-Pyrites; and I do hereby declare that the following is a full, clear, and exact description thereof, reference being had to the accompanying drawing, forming part of this specification, and which represents a vertical longitudinal section of a furnace adapted for the purpose.

This invention consists, first, in the use of a compound flux, as hereinafter specified, to be mixed with the ground ores on the hearth of the furnace, which flux, when the ore is heated, aids in liberating the sulphur, arsenic, phosphorus, or other elements that prevent the separation of the precious metals; secondly, in the utilization of the waste heat from the steam-boiler or other furnace, and the mode of applying the same in a reverberatory oven.

The ore is to be first crushed or stamped to a fine powder, and then mixed with the flux, composed of three per cent. of manganese, two per cent. of salt, about two pounds of sulphate of magnesia to a ton of ore, and the same quantity of nitrate of potash, and ten per cent. of carbon. These proportions may be slightly varied to suit the character of the ore to be treated. I therefore do not wish to confine myself to the exact quantities specified.

The ore, with its flux, is then to be spread on the hearth A of the furnace or oven, which is covered in above, as at B, and provided with doors C on each side, through which the ore may be worked. This oven is provided with a chimney, D, into which the noxious gases evolved can pass, and which is also open to the flue E beneath the hearth.

In order to economize fuel I arrange the oven contiguous to the boiler or other furnace used to supply power for stamping or crushing purposes, and from which furnace the unabsorbed caloric may be conducted either under or over the sole of the oven, or both, as desired, as represented in red outline in the drawing.

When the ore becomes heated during the process of desulphurization a blue flame is seen on its surface, and when this disappears the process is completed, and the ore is then to be removed to cool, ready for amalgamation.

By an increase of the proportion of carbon used in the flux the heat may be raised sufficiently to separate the metal from the scoria by smelting in a reducing-furnace.

What is here claimed, and desired to be secured by Letters Patent, is—

1. The combination of manganese, chloride of sodium, sulphate of magnesia, nitrate of potash, and carbon, in suitable proportions, substantially as herein set forth, as a flux, for the purpose specified.

2. Treating auro-pyrites and the like, when compounded with such flux, in an oven, heated by the waste caloric from a boiler or other furnace, substantially as shown and described, for the purpose set forth.

LORENZO SIBERT.

Witnesses:
SYDNEY E. SMITH,
W. MORRIS SMITH.